United States Patent [19]
Shonting

[11] Patent Number: 5,504,714
[45] Date of Patent: Apr. 2, 1996

[54] ACOUSTIC AND ENVIRONMENTAL MONITORING SYSTEM

[75] Inventor: David H. Shonting, Middletown, R.I.

[73] Assignee: The United States of America as represented by the Secretary of the Navy, Washington, D.C.

[21] Appl. No.: 394,106

[22] Filed: Feb. 24, 1995

[51] Int. Cl.$^6$ ................................................. H04B 17/00
[52] U.S. Cl. ................................................. 367/13
[58] Field of Search ........................... 367/13, 131, 135, 367/134, 4; 73/170.02, 170.16, 170.29, 170.31

[56] References Cited

U.S. PATENT DOCUMENTS

4,794,575  12/1988  Miller ........................ 367/134

*Primary Examiner*—Daniel T. Pihulic
*Attorney, Agent, or Firm*—Michael J. McGowan; Michael F. Oglo; Prithvi C. Lall

[57] ABSTRACT

The present invention relates to an acoustic and environmental monitoring system which correlates natural phenomena and the sound produced by that phenomena. The system includes a bottom mounted hydrophone for measuring/monitoring ambient sound produced by rainfall, waves and wind with the sensors for measuring/monitoring wave height and direction, wind speed and direction and rainfall rate being located within 100 meters of the sound monitoring hydrophone. The system further includes electrical circuitry for correlating the measured natural phenomena with the measured/monitored sea sound surface.

16 Claims, 7 Drawing Sheets

ACOUSTIC AND ENVIRONMENTAL MONITORING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an acoustic and environmental monitoring system for studying the sound produced by wind, breaking wave occurrence and rainfall.

(2) Description of the Prior Art and of Certain Related Concurrently Developed Technology The traditional torpedo-launching submarine has historically operated relatively independently of sea surface conditions. Although high sea states can cause severe rolling when the keelless submarine attains periscope depth, sea surface conditions do not particularly interfere with torpedo launch at deeper depths. With the advent of submarine-launched missiles, the state-of-the-sea surface and the wind has become a much more relevant environmental parameter which can adversely impact upon these newer submarine operations. High sea states are a concern when the submarine requires near-surface launch, because any severe rolling can limit or prevent missile deployment. The problems which arise are those associated with manipulating, loading and possible launcher jamming of these large weapon systems.

Missiles, depending on the type, can be vulnerable to the effect of high sea and wind conditions immediately after exiting launcher tubes as they ascend at various speeds and exit through the sea surface. The Harpoon missile for example has suffered fatal damage to control surfaces by dynamic pressures associated with the orbital motions of larger waves. The Tomahawk cruise missile can also suffer launch failure as a direct result of inadequate knowledge of wind conditions. This missile, during its in-water, rapid, rocket-driven ascension, is relatively unaffected by wave dynamics, but upon exiting the sea surface, it becomes a light aircraft, requiring lift determined by its relative air speed. An inadvertent downwind launch in a greater than 20 m/s (40-knot) wind speed could mean loss of critical lift and a sudden, unplanned return to the sea.

Thus, it is important to establish a viable method for submarines to monitor sea conditions in order to construct computer models which predict wind speed and rainfall rate at a particular location over the ocean by measuring the acoustic signatures and to develop an acoustic and environmental monitoring system to support the development of such a viable method. One such method entails acoustic sensing of sea surface conditions. Wind, wave whitecaps and precipitation are important sources of the ambient sound in the ocean. Each of these phenomenon has a unique acoustic signature which can be recorded and used as a basis to develop models to predict sea surface conditions.

Establishing a viable submarine monitoring capability requires a clear understanding of the sound spectrum and intensity levels produced by the various sea surface phenomena. The sources of sound in the ocean are both natural and man-made, displaying large variations in frequency, geographic location, and time. The ambient sound spectrum can be conveniently divided into three bands. In each, the acoustic energy tends to be supplied by a dominant source with overlap at the edges. The low band from 10 to 400 Hz is mostly associated with machinery of shipping or small boat traffic and coastal industry. The mid band from 400 Hz to 40 kHz is contributed principally by oceanographic/meteorological (i.e., geophysical) phenomena at the sea surface. The high band above 40 kHz is mostly low level energy associated with high wave number turbulence and molecular motions. To a lesser extent, in certain local areas, there is a contribution into the mid and high bands by fish noises and cavitation from high speed propellers.

The focus is on the mid range of frequencies for the monitoring of sea surface conditions. The sound spectrum in this mid band (400 Hz to 40 kHz) appears to be produced by the following phenomena:

a) interactions of wind pressure fluctuations at the sea surface;

b) splash impact and bubble formation associated with whitecapping; and c) rain, hail and snow impacting the sea surface.

Each of the above phenomena are by themselves complex, dynamical processes, largely turbulent in nature. Portraying the associated sound-producing mechanisms requires precise measurements and analysis to sort out the effects.

Studies of geophysical ambient sound have attempted to obtain relationships between the sound and wind speed, whitecapping (i.e., bubble formation) and rain rate. Results, however, are largely empirical and far from quantitative due to the inaccurate data obtained from the hydrophones. The general empirical relation is given as:

$$\log_{10} U, \log_{10} R = a(N_{s1}) + B \tag{1}$$

where

U is the observed wind speed,

R is the observed rainfall rate, $N_{s1}$ is the recorded sound pressure level (in dB) obtained from the hydrophones, and A and B are quasi constants depending on the sound source, range of frequencies and the range of intensities for either U or R.

The value A may vary with wind/wave conditions, e.g., at wind speeds below 6–7 meters per second, wind pressure fluctuations should be the prime sound source; at higher speeds, multiple contributions occur from whitecap splashing and bubbles, hence increased slope is expected.

In general, the wind and wave sound falls off with frequency at about 6 dB per octave, but the rolloff is not necessarily monatomic because specific-measurement spectral peaks are seen when whitecaps form. Rain sound falls off with frequency, but displays a distinct resonant peak around 15 kHz, owing to a droplet/bubble formation at impact. Wind shows the strongest correlation with sound, showing records from 4.3–14.5 kHZ. Correlation coefficients of the sound pressure levels with logwind speed ranged from 0.92–0.96. Rain, on the other hand, generates the highest/loudest signals in its normal ranges (attaining up to 40–60 dB for heavy downpour).

Assessment of the true correlation of the ambient sound with its sources (i.e., wind speed, waves and rainfall) requires precise measurement of the surface phenomena made at the immediate location of the sound observations. A very significant obstacle to progress in this regard has been the lack of a suitable system for obtaining field measurements relating sound to surface effects with the full range of intensities of wind and wave conditions.

A wide variety of devices have been used to monitor and measure sea conditions such as wave height, wave direction and ocean currents. U.S. Pat. Nos. 3,336,800 to Appleby, Jr. et al.; 3,375,715 to Hodges et al.; 3,765,236 to Erdely; 3,769,838 to Buckler; 3,899,668 to Tucker, Jr.; 3,983,750 to Kirkland; 4,515,013 to Hue; and 4,988,885 to Lindstrom illustrate various devices for measuring waves.

The Appleby, Jr. et al. patent discloses a submarine-based system for measuring wave height and direction. The system employs continuous upward echo ranging to obtain distance measurements from the submarine to the sea surface to provide an indication of wave height and direction. The Hodges et al. patent uses a similar system where acoustic signals are directed toward the sea surface from below the sea surface. The return acoustic signals are used to indicate the slope of the sea surface above the transducers generating the acoustic signals.

The Erdley patent relates to an apparatus for measuring swell frequency and propagation direction of an ocean wave. The apparatus incudes a water gauge which is partially submerged and a ballast. A flexible connection is provided to an anchoring device. The collector encloses a magnetic compass and a counter.

The Buckler patent illustrates yet another device for determining wave height. The device includes a buoy having an antenna which when floating on the sea, its motion causes electronic circuitry within it to transmit bursts of RF signals, the pulse repetition rate varying directly in proportion to the acceleration applied to the buoy as it moves up and down on the surface of the sea. Ship-borne apparatus is provided to receive the RF signals and analyze them to determine wave height. The Tucker patent also relates to a device for electronically analyzing waves.

The Kirkland patent illustrates a water-wave height and fluid measuring system having a partially submerged support mast which floats on the water. A radio frequency transmitter is mounted on the mast and a plurality of radio frequency receivers are mounted on the mast below the water line. Signals are communicated to remote locations with output signals being analog signals which represent wave height or other fluid level.

The Hue patent relates to a buoy having accelerometers and magnetometers for measuring characteristics of an ocean swell.

The Lindstrom patent relates to a submerged small angle field-of-view optical radiometer which passively measures ocean surface wave heights, characteristics, and statistics remotely. The radiometer measures varying underwater radiant light field and correlates that light field to surface wave heights. The device is connected to on shore or inboard electronics. The sensors can be bottom mounted on the sea floor or can be mounted on a submerged platform such as a submarine.

U.S. Pat. Nos. 4,172,255 to Barrick et al.; 4,221,128 to Lawson et al.; and 4,996,533 to May et al. relate to devices for measuring and/or monitoring ocean currents. The Barrick device uses radar to remotely sense near surface ocean currents in coastal regions. In operation, the radar detects slight velocity changes in ocean waves. The Lawson patent describes an acoustic current meter in which two channels have acoustic paths oriented at right angles to each other to measure orthogonal components of a current velocity. The May patent relates to a device for mapping ocean currents with a single radar.

Still other devices illustrate systems for measuring environmental conditions such as wind and rainfall. U.S. Pat. No. 4,143,547 to Balser and U.S. Pat. No. 5,125,268 to Caron illustrate such devices. U.S. Pat. No. 3,455,159 to Gies illustrates a nautical weather station which includes at least one floating buoy, a weighted cable attached to each buoy, and one or more hollow submerged bathymetric vehicles attached at various depths to the cable. Both the bathymetric vehicles and each buoy are equipped with weather and other environmental sensors. The weather data is transmitted from each buoy to remote receiving stations on interrogation.

Still other devices for measuring environmental and oceanographic data are shown in U.S. Pat. Nos. 4,760,743 to Clifford et al.; 3,936,895 to Talkington; 5,303,207 to Brady et al. and 4,805,160 to Ishii et al.

The lack of a suitable system for obtaining field measurements relating sound to surface effects has produced empirical relations (such as equation 1) devoid of physics. The lack of accurate field measurements has been due in part to the fact that the sound measurements taken to correlate with surface effects are made at relatively large distances, of often several kilometers, from the bottom-mounted hydrophones. The acoustic signal is thus obtained at a point in the ocean relatively distant from the surface area of generation, which itself is ill defined. Because of this "far-field geometry", individual surface effects are spatially smoothed out, i.e., such measurements cannot spatially resolve noise radiated from small-scale phenomena such as breaking wave crests and turbulent wind gusts. As a result, little can be inferred about the physical sound-generating mechanism at the surface or the geometry of the generating area.

Another very significant obstacle to such progress has been that most acoustic time series data obtained from the hydrophones have been heavily smoothed over periods of at least one to several hours. As with the deep hydrophone records, this smoothing can suppress/filter or mask possibly important smaller-scale fluctuations of sound sources associated with wind gusts, breaking waves or passages of wind squalls or rain cells. Moreover, the analysis of the time variability of the ambient sound field associated with the sea surface effects has perhaps been neglected in favor of establishing smooth predictive relationships from averaged data and hence high resolution sampling has been neglected. This results in analyses that have been relatively crude and often lacking in precise spectral characterization of acoustical signatures of the individual sound generators.

Clearly, the correlation of ambient sound with its generating sources is meaningful only to the degree that the true local source producing the sound is identified and simultaneously monitored. The problem of proximity of the sound sources from the hydrophone occurs with wind, and especially, rainfall noise correlations. To wit, due to the difficulty of measuring rainfall at sea, its measurement is often made on land many kilometers from the hydrophones. This can render the correlations at best, biased, and at worst meaningless, since the rainfall is seldom uniform over such separation distances. However, rain and sound comparison measurements have been made with hydrophones at 5–35 meter depths with rain locally measured, but these were in shallow lakes, thereby placing bottom-mounted hydrophones close to the source of the noise generating mechanisms.

Thus, more appropriate data is needed to better understand the physical mechanisms of the generation of ambient sound at the sea surface. A prior art apparatus for doing this is an inexpensive, totally self contained, stand alone unit, which constitutes an easily deployed ambient sound-recording system for taking rapidly sampled near-surface measurements of ambient sound. More particularly, it takes measurements of sound associated with rapidly changing wind and rainfall events measured in close proximity. This is disclosed in a paper by David Shonting and Foster Middleton entitled "Near-Surface Observations of Wind and Rain-Generated Sound Using the SCANR: An Autonomous Acoustic Recorder" in the Journal of Atmospheric and Oceanic Technology, Vol. 5, No. 2, April, 1988.

Figure 1:
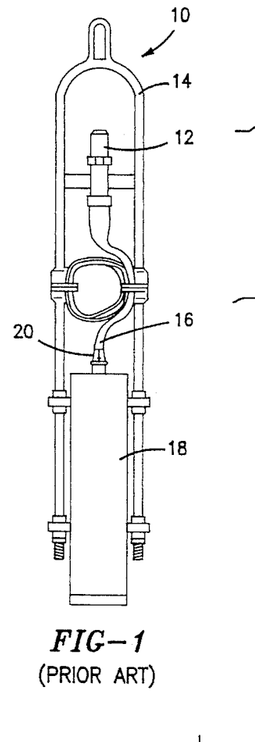
FIG. 1 illustrates a prior art noise measuring system.
Figure 2:
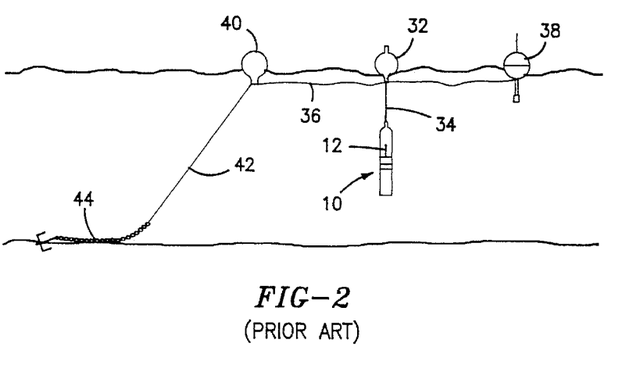
FIG. 2 is a schematic representation of the deployment of the prior art noise measuring system of FIG. 1.
Figure 3:
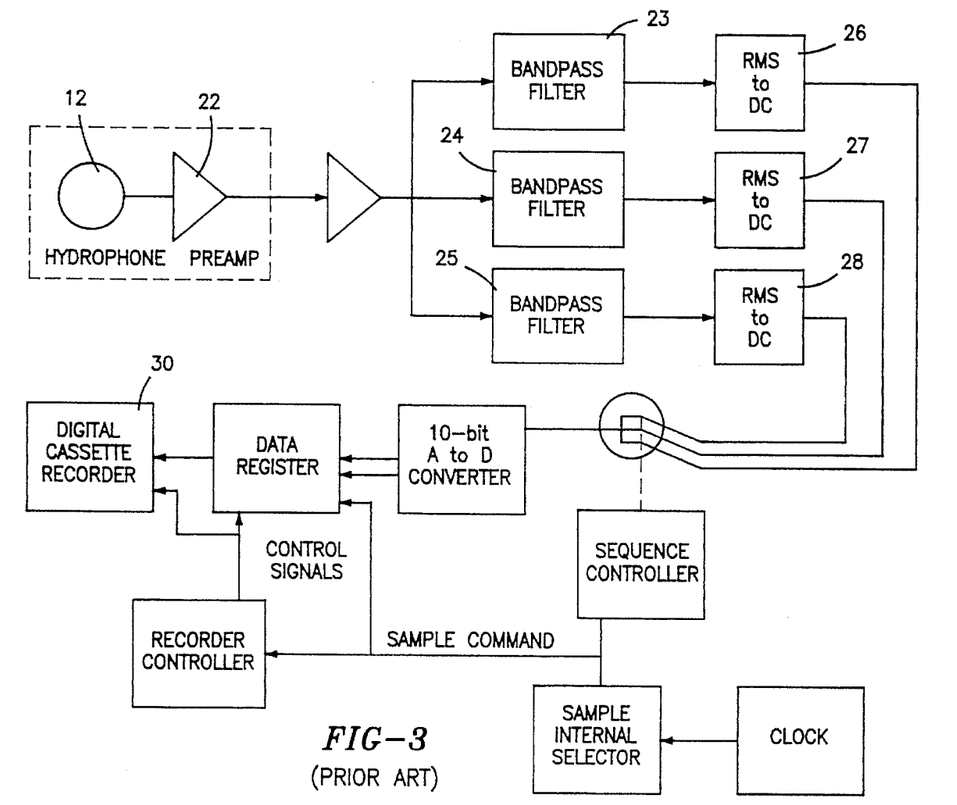
FIG. 3 is a schematic representation of the components of the prior art noise measuring system of FIG. 1.

The totally self contained, stand alone unit disclosed in the Shonting and Middleton paper is an acoustic monitoring system used by oceanographic personnel of the Department of the Navy, which will sometimes hereinafter be referred to as the First Generation, Self Contained Ambient Noise Recorder Unit 10, (or simply "SCANR-I unit 10"), which is shown in FIGS. 1, 2 and 3. FIG. 1 depicts the externally visible components of SCANR-I unit 10, which incorporates a low-noise hydrophone 12 configured for suspension from a surface buoy. The hydrophone 10, enclosed in a neoprene boot, is attached to a stainless steel support bridle 14 and mounted upright with its cable 16 leading to a pressure case 18, which in turn houses recording electronics and a battery pack. The pressure case 18 is connected to the hydrophone cable 16 by a 4-pin, water-tight connector 20.

The hydrophone employed in SCANR-I unit 10 has a free-field voltage sensitivity of −174 db//1v/uPa over the temperature range of 3°–20° C., remaining very flat from 0.1 to 35 kHz. The directivity response in the plane about the hydrophone's longitudinal axis over 15–22 kHz was omni-directional to within 0.5 dB; hence, its longitudinal axis was mounted vertically to provide horizontal receiving symmetry. The hydrophone and pressure case were capable of withstanding static pressures up to 700 meter depth (70 atm).

The signal processing (including recording) components of SCANR-I unit 10, shown in FIG. 3, depict the output from a hydrophone preamplifier 22 delivered to three bandpass filters 23, 24 and 25, centered at 15, 20, and 25 kHz respectively, with the 20 kHz ban convertible to a broad bandpass from 5–40 kHz. The frequencies were chosen because they occur in bands of efficient wind, wave and rain noise generation, as well as being above most ship traffic and coastal industrial noise frequencies.

The output of each filter 23, 24, and 25 was passed through an ac/rms converter chip 26, 27, and 28 with an 800 ms integration time. The voltages were sampled at 1 minute intervals, digitized as 10-bit words (i.e., 1/1024 resolution) and recorded on a Memodyne digital cassette deck 30. The SCANR-I unit 10 was powered by 24 D-cells which sustained the three channels at a 1 minute sampling rate for 7–8 days. Upon retrieval of the unit 10, data from the Memodyne cassette 30 is transferred to a portable computer and stored on disk for subsequent processing and analysis.

A mooring arrangement for suspending A SCANR-I unit 10 at mid-depths on the continental shelf from a moored buoy is depicted in FIG. 2. Unit 10 is suspended from a standard strobe float 32 via a 5–100 meter stainless steel cable 34. This permits the contained hydrophone 12 to receive a near-surface acoustic energy isotopically from the upper hemisphere. A 20 meter buoyant polypropylene line 36 enables the strobe float 32, a second tethered wave or meteorological buoy 38, and a third float 40 to remain afloat at a desired distance. The buoy 38 shown in FIG. 2 is an Endeco direction wave buoy 956 which provides a complete set of wave height, wave direction and ambient sound data at a single location. However, this buoy 38 can be eliminated if so desired. The strobe float 32 and buoy 38 are maintained in a desired location through the attachment of the third float 40 to a 2 cm diameter nylon 2-1 scope line 42 and a Danforth chain 44. The third float 40 prevents the SCANR-I unit 10 from becoming tangled around the nylon scope line 42 by positioning the line 42 at a distance from unit 10. All shackles connecting the vertical stainless steel tether cable are taped so as to minimize surface noise as the surface float bobs up and down in the wave field. As an alternative to this mooring arrangement, the SCANR-I unit 10 can be suspended from a fixed platform or a free-drifting surface float.

Investigations of correlation between natural surface phenomena and underwater ambient sound were conducted over the period November 1984 and May 1986 in Narragansett Bay, Rhode Island during which both wind and rainfall data were obtained. A SCANR-I unit 10 was suspended at 3–4 m depths from the end of 75 m long pier which extended north-westward from a sloping beach on Aquidneck Island. This point of observation had a depth of 12 m and maximum wind fetches of 12–15 km from the northwest and 6–7 km from the southwest. Wind and rainfall were monitored simultaneously with the ambient noise recordings at narrow bands centered at 15 and 25 kHz and a broadband. Wind speed and direction were directly recorded continuously with an R. M. Young Aerovane, while rainfall rate was measured with an AES tipping bucket system on a rooftop tower located 2.2 km south of the observation pier. The wind data was obtained on a strip chart recorder while the rainfall rate was logged on a period processor and digitally recorded on a Compaq computer disk memory.

A correlation of 0.97 of the 15 kHz band with wind-speed was obtained for a 24 hour period with winds ranging from 0.2–15 m/s. At higher sustained winds (12–15 m/s), a pronounced decrease occurred in sound pressure, which decrease appears due to increased absorption of the sound generated at the surfaces by the whitecap-produced bubble layer. Use of direct sound pressure output, in lieu of logarithmic sound levels, best showed the immediate acoustic response to changes of the wind field and rainfall rates associated with passing squalls. On the other hand, the correlation coefficient between the 15 kHz band and rain rate was only 0.068. The rain-noise correlations were rendered imprecise, in part, due to the horizontal separation of the rain gauge from the hydrophone (over 2 km) and, in part, because of the differences in the sampling of the rain gauge (at a point location) vis-a-vis the SCANR hydrophone collecting acoustic energy over a large area. Rain-produced sound attained 35 dB increase within 2–3 minutes during a passing line squall, which was tracked with an MIT weather radar at Cambridge, Massachusetts.

The SCANR-I unit 10 system proved useful for observing the near-surface ambient sound field at both broad and narrow bands up to 30 kHz. It is easily deployed and retrieved while nearby observations are made of wind speed, whitecapping intensity and rainfall rate.

An improved self contained, stand alone acoustic monitoring unit was made. Its development was concurrent with the development of the present invention. Also a part of the development of the improved stand alone unit and a part of the natural surface phenomena and ambient underwater sound correlation system of the present invention consist of one-in-the-same electronic components. The concurrently developed, improved self-contained, stand alone unit will sometimes hereinafter be referred to as the Second Generation, Self Contained Ambient Noise Recorder Unit (or simply "SCANR-II"). The entire SCANR-II unit is not shown in any of the figures of drawing hereof. As will be described in the Description of the Preferred Embodiment section below, the SCANR-II processor 124, FIG. 4 constitutes the components which are common to the two developments. In external appearance the SCANR-II unit is essentially the same as the SCANR-I unit 10 depicted in FIG. 10. A hydrophone is supported by a bridle assembly, which is attached to an instrument pressure case. The pressure case is connected to the hydrophone cable by a 4-pin, water tight connector, and it contains the battery pack and the signal processing (including recording) electronics. The SCANR-II unit incorporates an ITC model 6050C hydrophone. The hydrophone, pointing upward, receives acoustic energy approximately isotopically from the upper hemisphere. The hydrophone can be used at depths to 500 meters (50 atm).

Figure 4:
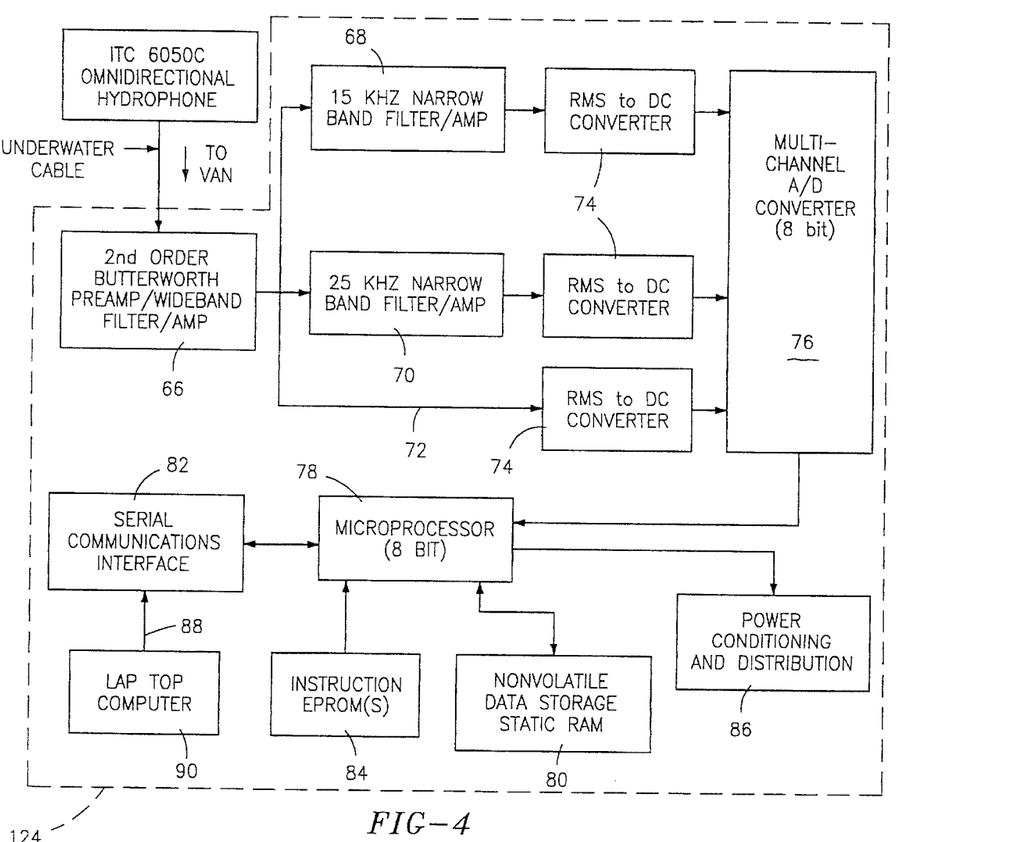
FIG. 4 is a schematic representation of the noise measuring system of the present invention (which by virtue of it representing components which are in common use as between the present invention and a concurrently developed SCANR-II unit is also useful in describing the latter)

The components common to the SCANR-II unit and the present invention, namely SCANR-II processor 124, FIG. 4, provide the signal processing (including recording) function in the SCANR-II unit. Within the SCANR-II unit, the components of SCANR-II processor 124 are mounted on two MUPAC wire-wrap boards. Referring again to FIG. 4, SCANR -II processor 124 operates on a 4 MHz clock which is programmed into AN EPROM chip 84 in the conventional manner of emulation of a counter. The incoming signal from the hydrophone is amplified and passed through a 2nd order Butterworth bandpass filter 66 with −3 dB cutoffs from 0.91 to 16.2 kHz. The output is then buffered and split, with two channels running parallel through a 15 kHz narrow band notch filter 68 and a 25 kHz narrow band notch filter 70. The outputs of the narrow band notch filters 68 and 70, along with a third direct unfiltered signal 72, run into RMS chips 74 and finally into a multi-channel 8-bit A/D converter 76.

The timing and control Central Processing Unit (CPU) is based on a Z-80 microprocessor 78, manufactured by the Ziolog Company, which interfaces to external memory chips forming a nonvolatile data storage static ram 80, the above described multi-channel A/D converter 76, a serial input/output chip 82, forming a serial communications interface three Erasable Programmable Read Only Memory (EPROM) chips 84 and the battery 86 to make up a microcontroller. All ICS are Compatible Metal Oxide Semiconductor (CMOS) technology to minimize power consumption.

Figure 5A:
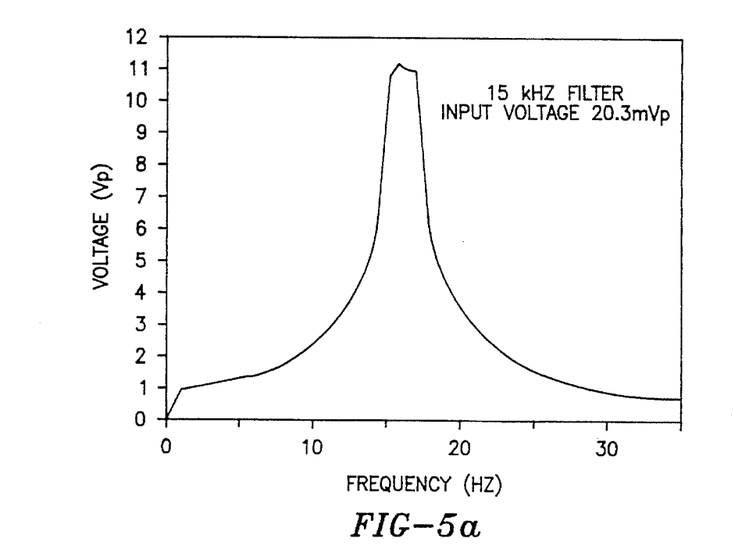
FIGS. 5a through 5c illustrate frequency vs. voltage outputs for components in the measuring system of FIG. 4.
Figure 5B:
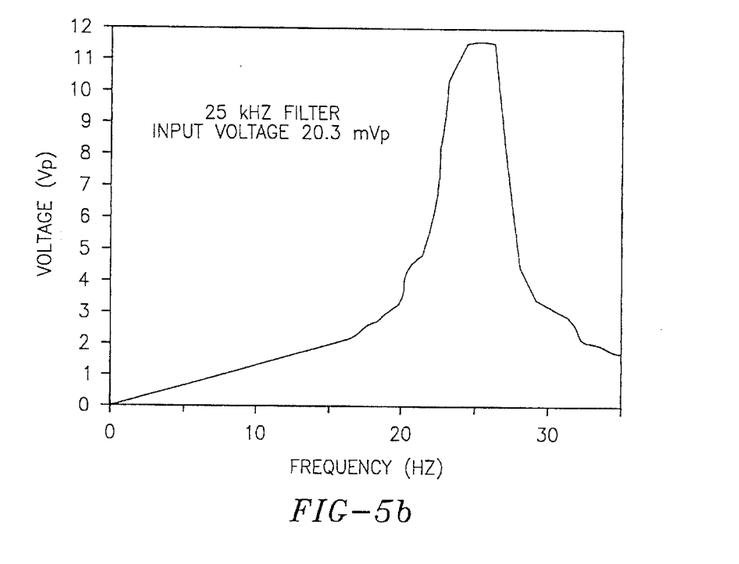
Figure 5C:
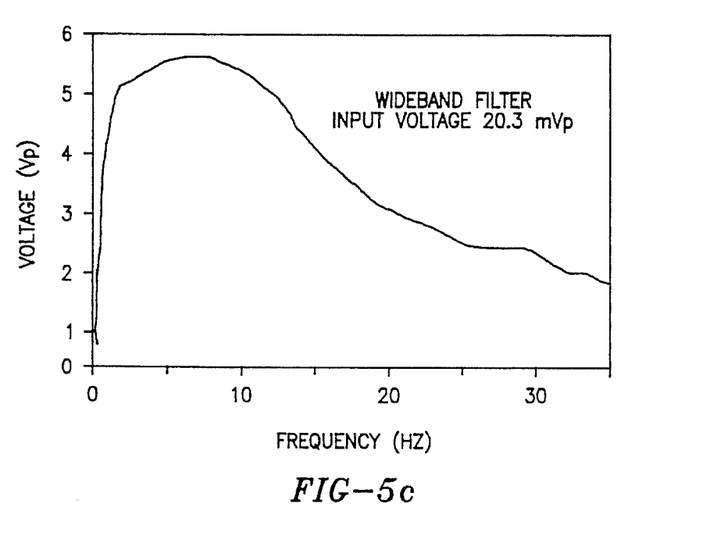

The improved SCANR narrow band filters 68 and 70 and wideband filter 66 were calibrated as follows: a fixed input voltage of 20.3 (peak voltage) sine wave was applied at 2 to 3 kHz increments from 0 to 35 kHz and to each of the 15 kHz and 25 kHz narrow band filters 68 and 70 and to the wideband filter 66, which produced the output voltages shown in FIGS. 5a–5c. The widths of the −3 dB down points gave bandwidths of 2.5 kHz, 4.5 kHz and 15.55 kHz for the 15 kHz, 25 kHz and wideband filters, respectively. The respective gains which were provided in each of the three effective channels, i.e. (i) input to hydrophone to output of the 15 kHz notch-type narrow band filter channel, (ii) input to hydrophone to output of the 25 kHz notch-type narrow band filter channel, and (iii) input to hydrophone to output of the 0.91 to 16.2 kHz wideband Butterworth filter; were 490, 488 and 228. These gains were effectively determined by the relative gain factor inherent to the filters, which were a matter of choice.

Referring to FIG. 4, the microprocessor 78 receives operational instructions from the three 64 Kl Erasable Programmable Read Only Memory (EPROM) chips 84; one EPROM for data acquisitions and two EPROMS for terminal communication. Data can be stored on either an 8K×8-bit (64K) or a 32K×8-bit (256K) Static Random Access Memory (SRAM) 80, which contains a lithium battery to retain data in the memory chip whenever the supply voltage falls below the operational threshold, is turned off, or if the chip is removed from the board.

An auxiliary microprocessor-based "RAM dump board", which resides in the microprocessor 78, is used to offload the data by the RS-232 interface 88 from the memory chip 80 to a laptop PC 90 for subsequent analysis. Data, downloaded in the laboratory ICs, and needed solely for outside communications, are removed to minimize power consumption.

In the event of a system hangup, there is a hardware reset switch connected to the microprocessor 78 that will restart the program. The data RAM 80 is addressed through a series of counters which are incremented by the microprocessor 78 so that if a system reset occurs, the data RAM 80 address does not get reset and no data is overwritten. The data is written in four byte blocks; first is an identification number and the rest are 8-bit values of the 15 kHz, 25 kHz and wideband RMS data. When the highest desired value is reached, the counters are reset to zero and held there so that no further data taking occurs. The counters can be reset only by a toggle switch located on the board.

Power is provided to the entire system by two battery packs 86. The first pack consists of eleven Ni-Cad 7.2 volt rechargeable individual units configured to provide three independent supplies of +14, −14 and 21.6 volts for use by the analog Board and hydrophone. All eleven individual batteries are configured in parallel and can be charged as one group. The second battery pack consists of twenty-eight Ni-Cad 1.2 volt individual units configured to provide 17 volts to a dc-to-dc converter, which in turn provides a steady regulated 5 volt supply to the auxiliary microprocessor-based "RAM dump board". Both battery packs 86 can be charged as a group by use of voltage dividers in line with the charging electrodes.

The procedure for data logging is as follows: the system is turned on and everything is reset. After an elapsed time, determined by the programmed chip, the CPU that resides in the microprocessor 78 turns on the relays to power the analog board and the hydrophone. A 10 second delay allows the RMS circuits 74 to fully energize and stabilize. The digitized values from the A/D converter 76 are read in by the microprocessor 78 and the relays are turned off. The microprocessor 78 then transfers the data to the data RAM 80, confirms the transfer, then counts down to the next sampling time. The process repeats until the last data RAM 80 address is filled. Circuitry prevents the relays from being turned on once the data RAM 80 has been filled. The sampling time is arbitrarily selected. A one minute interval was determined to be an appropriate sampling time since it was capable of capturing the pertinent meteorological events of windspeed, breaking wave occurrence and rainfall rate.

It is to be understood in use of SCANR-II unit, it is deployed in the same manner in which SCANR-I unit 10 is deployed beneath the surface of the ocean (as shown in FIG. 2 and discussed above).

Upon retrieval to a land facility of the SCANR-II unit, the digital data is extracted by means of the RS-232 serial communications interface 82 connected to the microprocessor 78. An example of the use of the SCANR-II unit is the gathering of acoustic information for comparison to environmental data obtained by above-the-ocean-surface instrumentation to provide empirical tables for estimating windspeed and rainfall rate. Once offloaded, the digitized RMS 74 data is converted to sound pressure levels which can then be plotted and compared to environmental data.

Despite the existence of the SCANR-II unit, there remains a need for a facility, particularly a shore based laboratory, for direct monitoring of the ambient sound produced by phenomena such as wind, waves and rainfall and for the study of the interrelation with environmental measurement of same.

SUMMARY OF THE INVENTION

Accordingly, it is an object of the present invention to provide an improved acoustic and environmental monitoring system for studying the sound produced by wind, waves and rainfall where the observation of all variables is done in close proximity (within 100 meters).

It is a further object of the present invention to provide a system as above in which data can be directly processed and analyzed to study sound-generation mechanisms.

It is still a further object of the present invention to provide a system as above whose data can be used to form models that can form a basis for providing submarines with acoustic monitoring capability for near surface operations.

Still other objects and advantages will become apparent from the following description and accompanying drawings in which like reference numerals depict like elements.

The foregoing objects are attained by the system of the present invention for correlating natural phenomena and the sound produced by that phenomena. A system in accordance with the present invention includes means for measuring natural phenomena such as wave height and direction, wind speed and direction, and rainfall rate; means for measuring sea surface sound produced by the natural phenomena such as a bottom surface positioned hydrophone; and means for correlating the measured natural phenomena with the measured sea sound surface. In the present invention, the correlating means are housed within a land based facility such as a mobile laboratory which is situated within 100 meters from the acoustic sensor and wave sensing buoy.

Details of the system of the present invention are set forth in the following description.

DESCRIPTION OF THE PREFERRED EMBODIMENT

Figure 6:
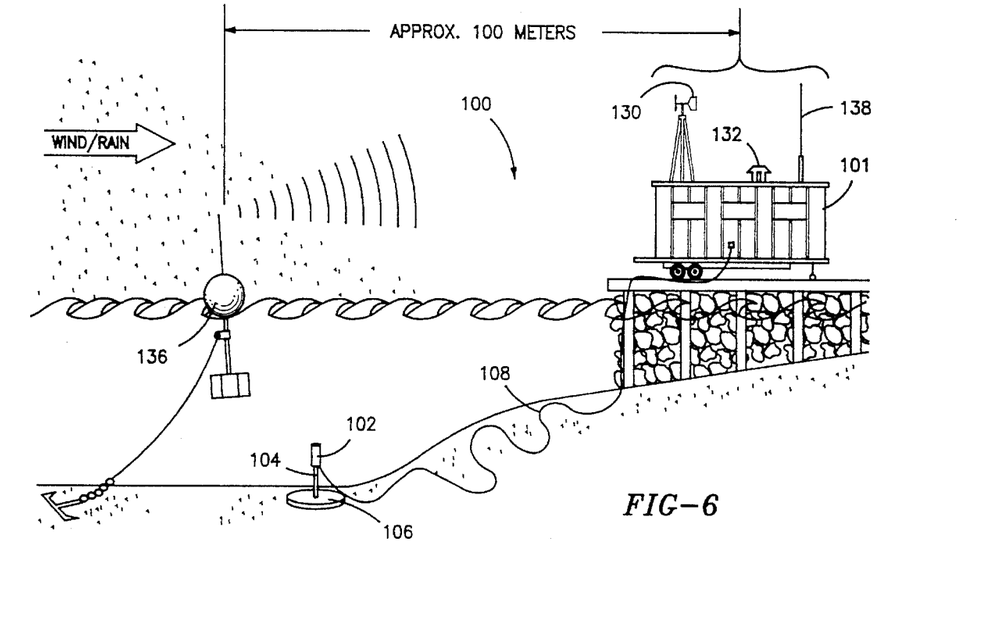
FIG. 6 is a schematic representation of the acoustic and environmental monitoring system of the present invention.

Referring now to the drawings, FIG. 6 illustrates an acoustic and environmental monitoring system 100 in accordance with the present invention. The system 100 includes various devices for measuring natural phenomena such as wave height and direction, wind speed and direction, and rainfall rate as well as one or more devices for monitoring sea surface sound. The system further includes means for correlating the monitored sea surface sound with the measured phenomena. In a preferred embodiment of the present invention, the correlating means are housed within a land based facility such as mobile laboratory 101.

In accordance with the present invention, ambient sound is measured with a sea bottom mounted SCANR-type hydrophone 102, such as an ITC 6050 low-noise bottom mounted hydrophone, which may be located a desired distance, such as about 100 meters (which in this specification and the appended claims is sometimes referred as "in close proximity"), from the land based facility 101. The depth of the water in which the hydrophone is positioned should not be too deep. Preferably, the water depth is on the order of about 10 meters. It is anticipated that in the future empirical data will be collect which will enable estimates of windspeed and rainfall to be made from a submerged submarine. The ITC 6050 low noise hydrophone has similar sensitivity characteristics to the hydrophone of the BQA-8 self noise monitoring system installed on U.S. Navy submarines. Hence, by incorporating the ITC 6050 hydrophone in the system for correlating the natural surface phenomena and underwater ambient acoustic signals of the present invention, the signals processed by the present invention will simulate, roughly, the surface-generated sound received by installed systems aboard a submarine, and can provide a base to help interpret the individual acoustic signatures of surface wind, breaking waves and rainfall from a submerged submarine. While a particular type of hydrophone is preferred, it should be realized that any type of hydrophone can be utilized. The hydrophone 102 detects the ambient sound over wide band frequencies from 5 kHz to 40 kHz.

The hydrophone 102 which is pointed upward to approximately isotopically receive acoustic energy from the upper hemisphere, may be fastened vertically to a 1 meter long steel shaft 104 welded to a 300 kg railroad wheel 106. Ideally, the land based facility 101 is located near a beach which gently slopes down tc the position of the hydrophone 102. Such a beach helps to dampen the waves generated by winds. The hydrophone power input and signal output are conducted via an underwater cable 108 encased in a garden hose and heavy PVC tubing to protect it from bottom drag and chaffing rocks. The cable 108 leads ashore and into the land based facility 101, which houses recording equipment for the hydrophone 102 and a suite of meteorological instrumentation.

Figure 7:
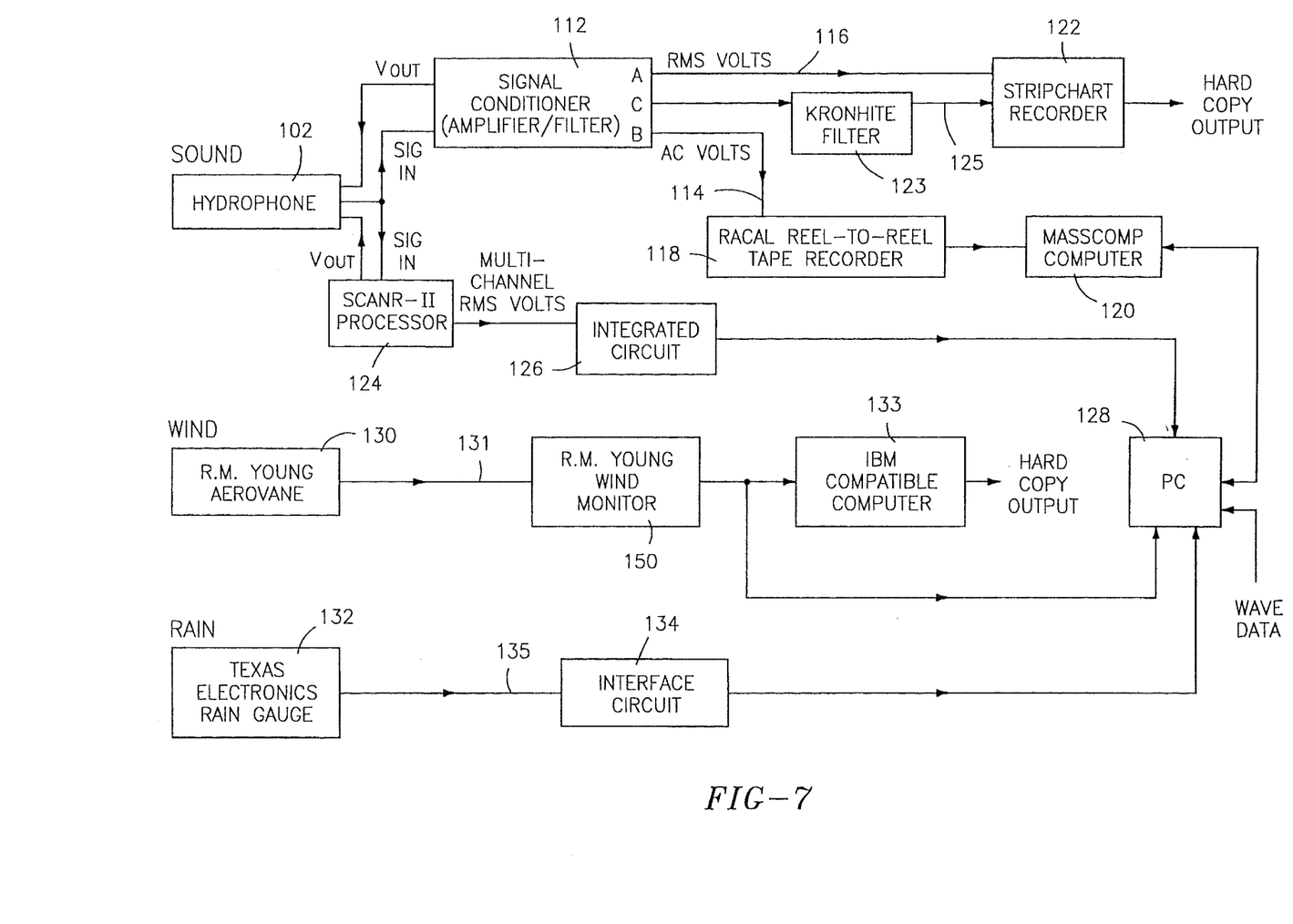
FIG. 7 is a schematic representation of the device for correlating measured acoustic signals with measured environmental conditions.

The ambient sound signals monitored and/or measured by the hydrophone 102 are transmitted to the land based facility 101, via the cable 108, and are processed by the equipment within the land based facility. The logging and processing of the sound or acoustic signal monitored and measured by the hydrophone 102 is illustrated in FIG. 7. As shown therein, the acoustic signal from the hydrophone is bifurcated into two components. The first component is introduced into a signal conditioner 112 comprising an amplifier and bandpass filter arrangement for providing a number of simultaneous outputs including a direct tape record voltage (Vac) bandpassed output 114 from 0.4 to 40 kHz and an RMS (Root Mean Square) voltage (Vdc) output 116 of the bandpassed signal. The signal conditioner may comprise any suitable amplifier and bandpass filter arrangement known in the art for providing the desired outputs.

The Vac voltage output 114 represents frequencies from the entire ambient sound spectrum. It may be monitored on an oscilloscope (not shown) and recorded on a recording device 118, such as a Recal reel-to-reel direct tape recorder, for playback and analysis on a digital computer 120 such as a concurrent Masscomp workstation. The computer 120 takes the tape recorded data and digitizes it at 80 to 100 kHz for subsequent spectral analysis. The computer 120, through its programming, also performs spectral measurements and analysis required to distinguish the sound generated by the wind, wave or rainfall and plots the results. The programming used within the computer does not form part of the present invention and may comprise any suitable program known in the art for carrying out the aforementioned functions. The Recal reel-to-reel tape recorder 118 is preferred for the correlation system because it is very precise and is capable of handling wide frequency responses. The RMS Vdc signal 116 is a slowly varying voltage signal that represent those frequencies produced by the geophysical effects, i.e., wind, waves, and rain fall, and the interfering noise caused by ship traffic and other industrial phenomena in the low band of the ambient sound spectrum. The RMS voltage is plotted on a stripchart by a stripchart recorder 122 for monitoring and warning of approaching ship/boat traffic which can interfere with the analysis of the sea surface sounds. The transient signatures of such ship/boat traffic are clearly distinct from the sounds of natural phenomena such as wind and rain sounds. A review of the data plotted by the recorder 122 can determine if a particular signal detected by the hydrophone 102 was produced by ship traffic or industrial noise. This data can then be compared with data from a SCANR processor 124 in order to verify that the signal processed by the SCANR processor was in fact due to low band frequencies.

If desired, a Krohnite filter 123 may be used for receiving a third output from the signal conditioner 112 to generate a signal 125 which provides a second channel of reduced traffic noise ranging from pleasure and fishing boats to large maritime carriers plying a channel or other water body. The signal 125 may also be plotted on a stripchart using the recorder 122. The Krohnite filter is useful because it limits those frequencies that will be studied and recorded in order to explore particular frequencies. The use of the Krohnite filter in the context of the present invention is believed to be unique.

The second component of the acoustic/sound signal from the hydrophone is passed to electronic components for signal processing (including recording). As noted in discussion in the Description of Prior Art and Certain Related Concurrently Developed Technology section hereof, these components are one in the same as those for the concurrently developed SCANR-II unit, (not shown), and will hereinafter sometimes be referred to as SCANR-II processor 124, FIG. 4. In the SCANR-II unit (not shown) processor 124 is a battery powered acoustic monitor and recorder, and as part of a self-contained, stand-alone unit is normally housed in a pressure case that is attached to a hydrophone, and then deployed at depth tethered from a surface buoy to record in the open ocean. However, in accordance with the present invention, SCANR-II processor 124 is set up in the land based facility 101, FIG. 3. Referring to FIG. 4, the hydrophone sound signal is lead into the filter amplifier 66 wideband (1 to 26 kHz) and also to the 15 and 25 kHz narrow band pass filters 68 and 70 (each about 3 kHz wide). Referring to FIG. 7, the signals coming out of SCANR-II processor 124 are digitized and transmitted to a 256 k (32×8 k) random access memory (RAM) integrated circuit 126 in 8-bit format for storage. The integrated circuit 126 communicates with a second computer 128. Information contained in the integrated circuit 126 may be downloaded to the computer 128 as required. The computer 128 preferably comprises a laptop or other personal computer having a disk storage capacity.

The logging or monitoring procedures of the wind, rain and wave measuring devices are shown in FIGS. 6 and 7. The wind speed and direction are preferably measured by an R. M. Young Aerovane 130. The aerovane may be mounted to the land based facility 101. For example, it may be mounted on the land based facility at a desired height such as about 9.8 meters above sea level. The wind data output 131 from the aerovane 130 is transmitted to a commercially available R. M. Young wind monitor 150 where it is processed and digitized. The digitized data is then recorded on the storage disk associated with the computer 128. Additionally, the digital output may be printed out using an IBM compatible printer 133 as readings each second, a six minute average and standard deviation. The use of the aerovane 130, wind monitor 150, IBM compatible printer 133 and the computer 128 in the system of the present invention is also believed to be unique.

The digitized data from aerovane 130 and data from the SCANR processor 124 can be interchanged between the computers 120 and 128 and plotted. The computers 120 and 128 may be programmed to perform different kinds of analysis in comparing the wind speed data from the aerovane to the SCANR processor data. This comparison may also be used to further study/verify the accuracy and the results of the obtained from SCANR-II processor 124 data for identifying and processing the wind speed and breaking wave occurrence.

The rainfall rate may be measured with a Texas Electronics tipping bucket rain gauge 132 which is preferably positioned on the roof of the land based facility 101. The rain gauge generates an output signal 135 which is fed to an interface circuit 134 which may be a signal conditioner that processes and digitizes the rain gauge data. The processing of the rainfall rate data takes into account the fact that rainfall does not occur at a steady rate. As a consequence of this fact, the time interval between pulses which indicate the rain gauge has tipped varies. These time intervals are measured by starting and stopping a clock. They are then processed to yield a function which is proportional to the rainfall rate. This function is the reciprocal of a series of the aforementioned time intervals. It is also the output of the interface circuit 134 which is transmitted to the computer 128 for storage on the disk associated therewith. The tipping frequency of the rain gauge 132 is directly proportional to the rainfall rate and is written as a time series directly on disk. The foregoing elements in the rain gauge channel of the correlating device of the present invention is also believed to be unique. If desired, the digitized rain gauge data and obtained from SCANR-II processor 124 data can be interchanged between the computers 120 and 128 and plotted. As before, the computers 120 and 128 may be programmed to perform different kinds of analysis which compares the rain gauge data from the rain gauge 132 to the data from SCANR-II processor 124. The comparison may then be used to further study/verify the accuracy and the results of the data from SCANR-II processor 124 for identifying and processing the rain fall rate.

Wave observations are preferably made with an ENDECO 956 Wavetrack Directional Buoy 136 moored within about 20 to 30 meters of the hydrophone 102. The buoy 136 automatically samples vertical acceleration and x-y tilt to measure/monitor wave height and direction. The sampling takes place at 2 Hz for a 20 minute record each hour. The data from the buoy 136 is telemetered to the land based facility 101 via telemetry equipment (not shown) aboard the buoy and an FM antenna 138 mounted to the land based facility 101 which provides the frequency modulation signal for the buoy 136. The wave data is doubly integrated, vector averaged and digitized using conventional electronic components located within the land based facility. The digitized wave data is then stored on the disk associated with the computer 128.

The digitized data from the recorder 118, SCANR-II processor 124, and the wave buoy 136, and the stored wind and/or rain data may be imported to the computer 120. In the computer 120, the time series may then be edited, filtered, analyzed, correlated and plotted to produce a time series of RMS sound pressure or dB level, wave height, wind and rain. The computer 120 may be programmed to carry out these functions using any suitable program known in the art. From this time series, one can study the relationship between wind speed, breaking wave occurrence and rainfall rate and their generated sound.

In an alternative embodiment, the acoustic/sound signal from the hydrophone 102 can be sent directly to SCANR-II processor 124 for processing by it, and then downloaded to the computer 128. Unlike the signal conditioner 112, SCANR-II processor 124 only filters out specific frequencies within the mid band of the ambient sound spectrum (15 and 25 narrow band frequencies and wideband frequencies). The digitized data from SCANR-II processor 124, and the direct tape record data, can then be interchanged between the computers 128 and 120 and plotted. This enables the data from SCANR-II process 124 and the processed direct tape record voltage data to be compared. The computers 120 and 128 could then be used to perform different kinds of analysis in comparing the two types of data. The comparison could then be used to study/verify the accuracy and the results of the data from SCANR-II processor 124 for identifying and processing the wind speed, breaking occurrence and rain fall rate.

An Ocean Acoustic Van (OAV) laboratory incorporating the system of the present invention was established on the Midway Jetty on Narragansett Bay, R.I. to study sea surface sound produced by wind, waves, and rain by accurately measuring the sound from a bottom mounted hydrophone and its geophysical sound sources in close proximity. This OAV location was ideal for observing waves generated by prevailing southwest to northwest winds with 4 to 10 km of fetch over a relatively smooth bottom, varying in depth from 10 to 30 meters. Events such as line squalls, fronts or thunderstorms arrive from the west and thus track over the Bay before arriving at the OAV monitoring systems. The MIT weather radar project in Cambridge, Mass. provided time-series radar plan position indicator tracking of rainfall cells and fronts advancing across the Bay. Such data was useful in that it could be matched up with the arrival and time variability of the winds and rainfall over the hydrophone location.

Aside from the possible interference and contamination of the geophysical sound recordings by vessel and boat traffic, there was concern that strong semidiurnal tidal currents which attain 15 to 20 cm/s might generate flow noise bias at the hydrophone. However, ambient sound recorded during calm wind and wave conditions at peak and slack currents indicate no detectable flow noise contamination.

Figure 8A:
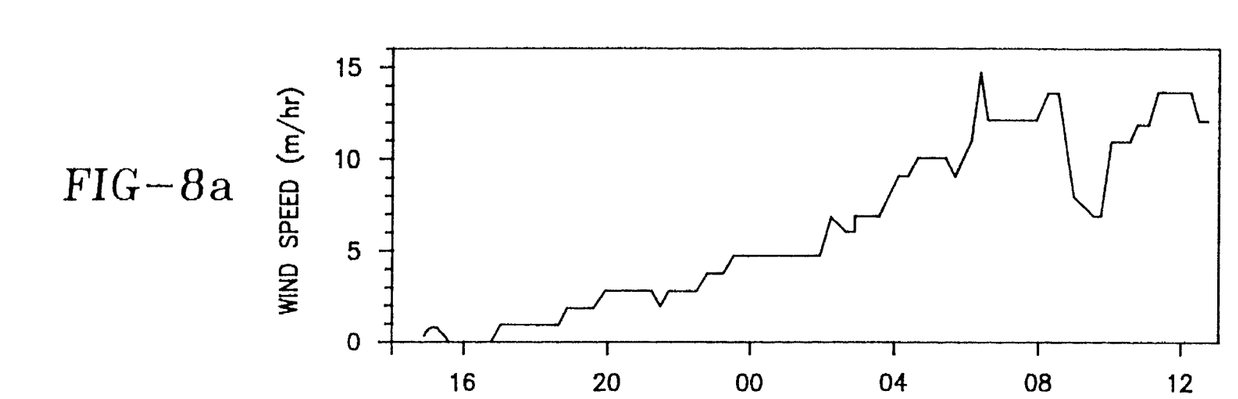
FIGS. 8a and 8b are plots of the parameter wind speed, and 15 kHz narrow band RMS acoustic pressure, respectively, with these parameters plotted relative to identical time series in order to facilitate comparison.
Figure 8B:
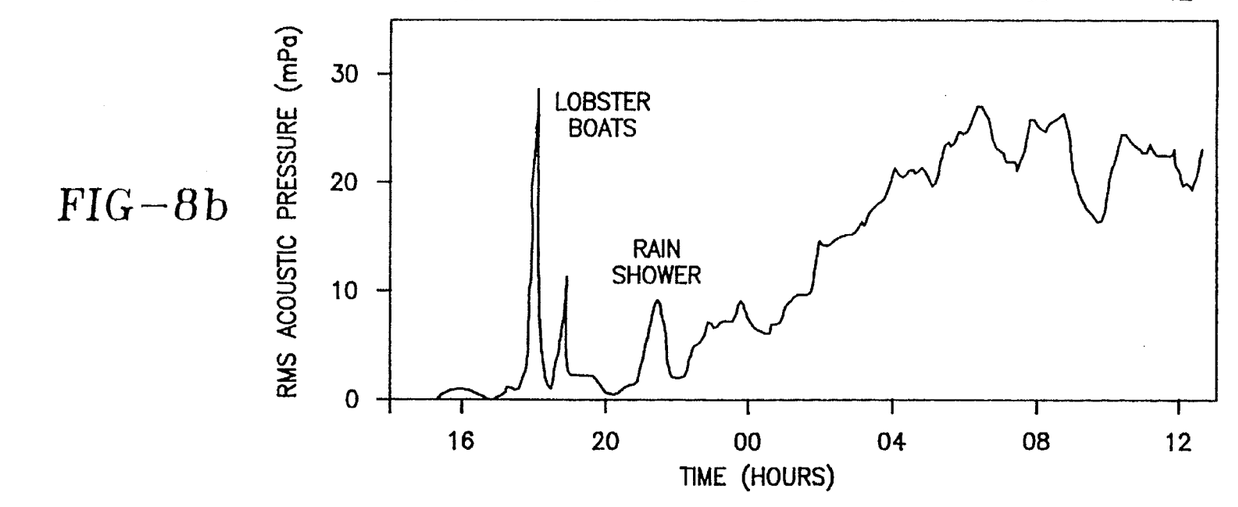

The initial OAV observations at the Narragansett Bay site consisted of the acoustical signatures of various wind and wave conditions, passages of weather fronts and rain events. FIG. 8 is a 24 hour time series of 15 kHz narrow band passed ambient sound compared with recorded wind speed where the wind steadily increased from calm to 14 to 15 m/s. An ordinate of mPa (RMS sound pressure) is used instead of the conventional dB since the latter tends to smooth out sound fluctuations which are desirable for comparison with recordings of rapidly changing wind, wave or rain conditions. The sound closely follows the wind except for the interruptions of the fishing boats and a small rain shower. The 0900 lull in the wind corresponds to an identical drop in sound with a slight 5–10 minute lag. The decrease in the sound at 1200–1500, while the winds are strong, is due to the intense whitecapping, thickening the bubble layer which, in turn, absorbs the sound radiating down from the sea surface.

Figure 9A:
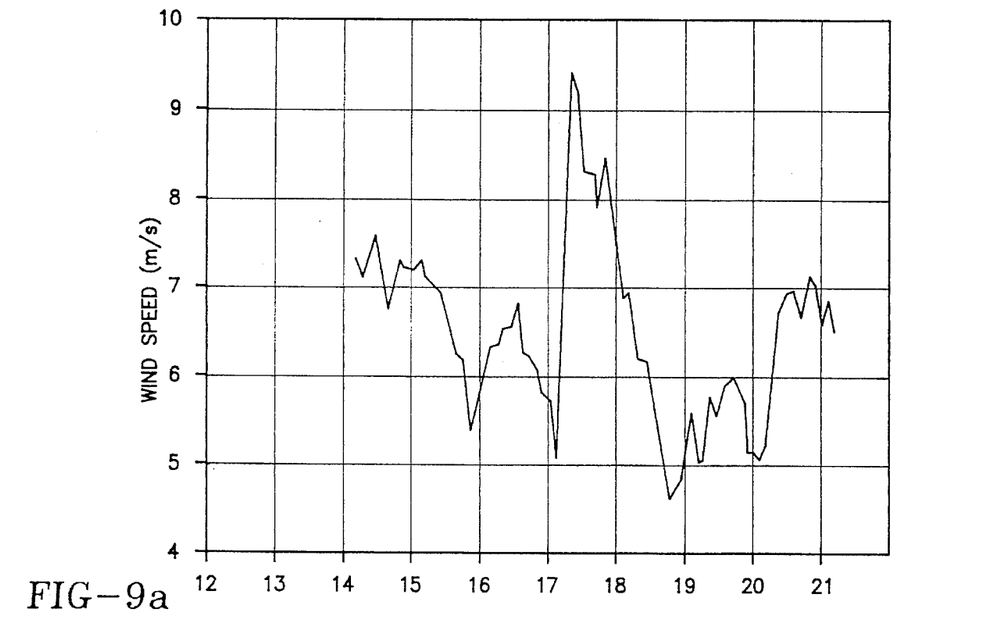
FIGS. 9a and 9b are plots of the parameters wind speed, and RMS sound pressure, respectively, with these parameters plotted relative to identical time series in order to illustrate the acoustical response of the system of the present invention to a rapid change in wind.
Figure 9B:
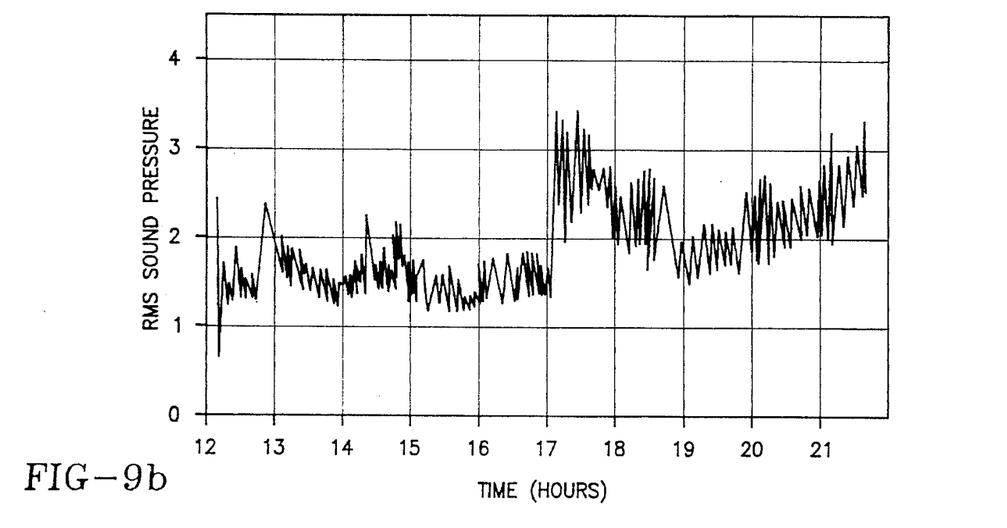

An example of the acoustic response to rapid change on wind speed is shown in FIG. 9 where a wind acceleration from approximately 5 m/s to 9.7 m/s occurred within four minutes. The ambient sound RMS hydrophone voltage shows virtually instantaneous tracking of the response (equivalent to 15 to 18 dB). This acoustic jump is likely a direct effect of sudden wind stress and not whitecap or bubble-generated sound, because from the onset of the wind gust, no whitecaps were observed during the first six to eight minutes.

Figure 10A:
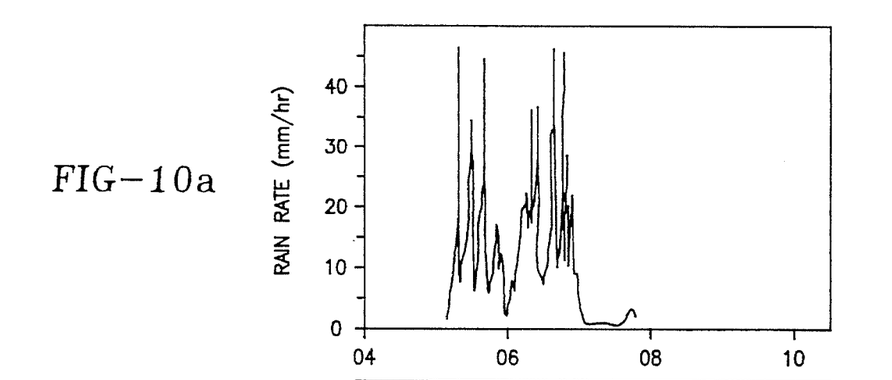
FIGS. 10a and 10b are plots of the parameters rain rate, and sound pressure, respectively, with these parameters plotted relative to identical time series in order to illlustrate the acoustic signature of a rain squall compared with measured rain rate.
Figure 10B:
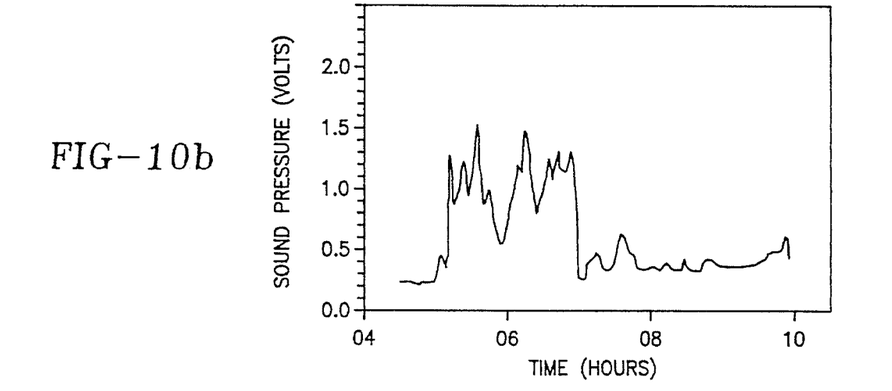

FIG. 10 shows the acoustical response to passing showers in which, within the limits of measurement, appears to within 10–20 seconds of the abrupt onset of rain. This acoustic signal should be largely rain driven since the wind speed was low, from 1–3 m/s.

The system of the present invention is a unique shore based laboratory for direct monitoring of ambient sound produced by wind, waves, and rainfall and for the study of the interrelation with environmental measurement of same. Data can be directly processed and analyzed to study sound-generation mechanisms and verification of prediction models. Such models can form a basis to provide submarines with acoustic monitoring capability for near surface operations, especially since the hydrophone is similar to their BQA-8 systems.

If desired, an additional hydrophone, placed some 100 to 200 meters away from hydrophone 102, may be added to the system of the present invention. The additional hydrophone will be of use in examining the fine structure of the insonified field that moves with the wind, weather fronts and rain cells by observing and correlating the two signals to determine phase shifts and spatial time structure.

Additionally, a video camera may be added to the land based facility. Ideally, the video camera will be equipped with a zoom lens. The provision of such a camera will allow recording of individual whitecaps within a 10 to 20 meter radius of the hydrophone epicenter. This may help to interpret the large pulses and otherwise high variability in the sound sources, as well as to identify the extent to which sound sources are due to wind gusts, whitecaps and bubble formation.

The data gathering and processing equipment associated with the system of the present invention provide the unique capability to simultaneous measure the ambient sound and the sound-generating phenomena within a distance of about 100 to 120 meters of each other. This data can be intercompared to assess and characterize the acoustic signals associated with each of the generation variables to a degree heretofore unavailable.

It is apparent that there has been provided in accordance with this invention an acoustic and environmental monitoring system which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for correlating natural phenomena occurring at the surface of the ocean with ambient sound beneath the surface produced by said phenomena comprising:

means for measuring said natural surface phenomena;

means including a hydrophone disposed in a predetermined spaced relationship below the surface of the ocean and adapted to substantially isotopically receive sound energy from the upper hemisphere, for measuring sound produced by said natural phenomena;

means for correlating said measured natural surface phenomena with said ambient sound produced by the surface phenomena; and said correlating means being housed within a land based facility and said natural surface phenomena measuring means and ambient sound measuring means being in close proximity to one another.

2. The system of claim 1 wherein said a hydrophone is mounted to the sea bottom.

3. The system of claim 1 wherein said hydrophone comprises a hydrophone having a sensitivity characteristics similar to that of a submarine hydrophone, whereby the output of the correlating means is representative of correlations obtainable in connection with the operations of submarines.

4. The system of claim 1 wherein said natural phenomena measuring means comprises:

means for measuring wind speed and direction;

means for measuring rain rate; and means for measuring wave height and direction.

5. The system of claim 4 wherein said wind speed and direction measuring means comprises an aerovane mounted to said land based facility.

6. The system of claim 4 wherein said rain rate measuring means comprises a tipping bucket rain gauge positioned on said land based facility.

7. The system of claim 4 wherein said wave action measuring means comprises a buoy having means for automatically sampling vertical acceleration and x-y tilt and means for telemetering data about said vertical acceleration and said x-y tilt to said land based facility.

8. The system of claim 4 further comprising:

said hydrophone generating a sound signal; and said correlating means including a signal conditioner amplifier for receiving said sound signal and for providing a Vac bandpassed output from 0.4 to 40 kHz and an RMS Vdc bandpassed output.

9. The system of claim 8 wherein said correlating means further comprises:

first means for recording said Vac bandpassed output and second means for recording said RMS Vdc bandpassed output.

10. The system of claim 8 wherein said correlating means further comprises a Krohnite filter for filtering said conditioned and amplified sound signal for providing a channel of reduced traffic noise.

11. The system of claim 8 wherein said correlating means further comprises:

first computer means for analyzing said Vac bandpassed signal, said first computer means comprising a high speed digital computer.

12. The system of claim 11 wherein said correlating means further comprises:

an ambient sound processor housed within said land based facility, said ambient SCANR processor receiving said sound signal from said hydrophone and providing first and second parallel narrow bandpassed outputs derived from said sound signal and individually digitalizing said first and second narrow bandpassed outputs, said first narrow bandpassed output being approximately at 15 kHz and said second narrow bandpassed output being approximately a 25 kHz;

random access memory storage means for storing said digitized first and second narrow bandpassed outputs; and second computer means communicating with said random access memory storage means for receiving said digitized first and second narrow bandpassed output.

13. The system of claim 12 wherein:

said wind speed and direction measuring means outputs a signal representative of wind speed and wind direction; and said correlating means further comprises first means for digitizing said signal representative of said wind speed and wind direction, said first digitizing means communicating with said second computer means.

14. The system of claim 13 wherein:

said rain rate measuring means generates a rainfall rate signal; and said correlating means further comprises an interface circuit for digitizing said rainfall rate signal, said interface circuit communicating with said second computer means.

15. The system of claim 14 wherein:

said wave action measuring means generates a signal representative of wave height and direction; and said correlation means comprises means for processing and digitizing said wave height and direction signal, said processing means communicating with said second computer means.

16. The system of claim 15 wherein said first computer receives data about said wave height and direction, said wind speed and direction and said rainfall rate and data received from said sound processor from said second computer means, and correlates the thusly received data to produce time series of sound pressure, wave height and direction, wind speed and direction and rainfall rate.

* * * * *